United States Patent
Noureddine et al.

(10) Patent No.: US 12,348,415 B2
(45) Date of Patent: *Jul. 1, 2025

(54) SCALED-OUT TRANSPORT AS CONNECTION PROXY FOR DEVICE-TO-DEVICE COMMUNICATIONS

(71) Applicant: Microsoft Technology Licensing, LLC, Redmond, WA (US)

(72) Inventors: Wael Noureddine, Santa Clara, CA (US); Felix A. Marti, San Francisco, CA (US); Aibing Zhou, San Jose, CA (US); Dmitriy Leonidovich Budko, Los Altos, CA (US); Gaurav Gupte, San Jose, CA (US); Hoai Vu Thanh Tran, Gilroy, CA (US); Aravind Vidhyasagar Lappasi, Austin, TX (US); Leith Alan Leedom, Palo Alto, CA (US); Rajesh G. Nair, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/188,532

(22) Filed: Mar. 23, 2023

(65) Prior Publication Data
US 2023/0224247 A1 Jul. 13, 2023

Related U.S. Application Data

(63) Continuation of application No. 17/248,828, filed on Feb. 9, 2021, now Pat. No. 11,637,773.
(Continued)

(51) Int. Cl.
*H04L 45/64* (2022.01)
*H04L 9/40* (2022.01)
(Continued)

(52) U.S. Cl.
CPC ........ *H04L 45/64* (2013.01); *H04L 12/40013* (2013.01); *H04L 12/4633* (2013.01); *H04L 45/66* (2013.01); *H04L 63/20* (2013.01)

(58) Field of Classification Search
CPC ............... H04L 45/64; H04L 12/40013; H04L 12/4633; H04L 45/66
See application file for complete search history.

(56) References Cited

U.S. PATENT DOCUMENTS 10,223,314 B2 * 3/2019 Kollu .................. G06F 13/4282
10,659,254 B2   5/2020 Sindhu et al.
(Continued)

OTHER PUBLICATIONS

Prosecution History from U.S. Appl. No. 17/248,828, dated Aug. 1, 2022 through Dec. 28, 2022, 43 pp.
(Continued)

*Primary Examiner* — Kodzovi Acolatse
*Assistant Examiner* — Anindita Sen
(74) *Attorney, Agent, or Firm* — Alleman Hall & Tuttle LLP

(57) ABSTRACT

Techniques are described for providing a scaled-out transport supported by interconnected data processing units (DPUs) that operates as a single system bus connection proxy for device-to-device communications within a data center. As one example, this disclosure describes techniques for providing a Peripheral Component Interconnect Express (PCIe) proxy for device-to-device communications employing the PCIe standard. The disclosed techniques include adding PCIe proxy logic on top of a host unit of a DPU to expose a PCIe proxy model to application processors, storage devices, network interface controllers, field programmable gate arrays, or other PCIe endpoint devices. The PCIe proxy model may be implemented as a physically distributed Ethernet-based switch fabric with PCIe proxy logic at the edge and fronting the PCIe endpoint devices. The intercon-
(Continued)

nected DPUs and the distributed Ethernet-based switch fabric together provide a reliable, low-latency, and scaled-out transport that operates as a PCIe proxy.

15 Claims, 7 Drawing Sheets

Related U.S. Application Data

(60) Provisional application No. 62/975,033, filed on Feb. 11, 2020.

(51) Int. Cl.
*H04L 12/40* (2006.01)
*H04L 12/46* (2006.01)
*H04L 45/00* (2022.01)

(56) References Cited

U.S. PATENT DOCUMENTS

| | | | |
|---|---|---|---|
| 10,686,729 B2 | 6/2020 | Sindhu et al. | |
| 10,725,825 B2 | 7/2020 | Sindhu et al. | |
| 2009/0097487 A1* | 4/2009 | Mishra | H04L 65/70 |
| | | | 370/392 |
| 2015/0160984 A1* | 6/2015 | Inagaki | G06F 15/17 |
| | | | 710/266 |
| 2017/0026300 A1* | 1/2017 | Rimmer | H04L 47/39 |
| 2017/0048158 A1* | 2/2017 | Park | H04L 47/72 |
| 2017/0054593 A1* | 2/2017 | Borikar | H04L 49/35 |
| 2018/0013583 A1* | 1/2018 | Rubenstein | H04L 61/4511 |
| 2018/0048569 A1* | 2/2018 | Sajeepa | H04L 45/66 |
| 2018/0314670 A1* | 11/2018 | Solki | G09G 5/363 |
| 2019/0012278 A1 | 1/2019 | Sindhu et al. | |
| 2019/0104206 A1 | 4/2019 | Goel et al. | |
| 2019/0215200 A1 | 7/2019 | Uberoy et al. | |
| 2019/0258505 A1* | 8/2019 | Gao | G06F 9/45558 |
| 2020/0073840 A1 | 3/2020 | Mekad et al. | |
| 2020/0320023 A1* | 10/2020 | Litichever | G06F 21/82 |
| 2021/0250285 A1 | 8/2021 | Noureddine et al. | |
| 2022/0060382 A1* | 2/2022 | McGraw | H04L 49/70 |
| 2022/0217012 A1* | 7/2022 | Mutter | H04L 12/40084 |

OTHER PUBLICATIONS

Siman-Tov, "The Case for Disaggregated Storage," Fungible, White Paper, Sep. 18, 2019, 4 pp.
Wang, "Overcoming Network Challenges when Pooling Disaggregated Resources at Scale," Fungible, White Paper, Jul. 1, 2019, 4 pp.

* cited by examiner

SCALED-OUT TRANSPORT AS CONNECTION PROXY FOR DEVICE-TO-DEVICE COMMUNICATIONS

This application is a continuation of U.S. patent application Ser. No. 17/248,828, filed Feb. 9, 2021, which claims the benefit of U.S. Provisional Appl. No. 62/975,033, filed Feb. 11, 2020, the entire content of each of which is incorporated herein by reference.

TECHNICAL FIELD

This disclosure relates to communications, and more specifically, to scale out of a system bus connection across a data center fabric.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and may be distributed across multiple geographies for redundancy.

Such networks include devices that may be physically close to each other, such as a collection of servers and/or other devices located within a data center or within a data center rack, and that may have a need to communicate with each other directly. A number of techniques have been used for such communications, including those using device-to-device communications employing the Peripheral Component Interconnect Express (PCIe) standard. While PCIe has been and may continue to be used for device-to-device communications, PCIe was developed as a high-speed serial computer system bus standard for communications over very short distances between devices within the same system. Although it is possible for PCIe to be used for communications between devices not within the same system, such an arrangement is not always optimal. The communication speeds in such an arrangement might not be sufficiently high, and the cost and/or availability of the hardware required to implement such a solution can also be a limitation.

SUMMARY

In general, this disclosure describes techniques for providing a scaled-out transport supported by interconnected data processing units (DPUs) that operates as a single system bus connection proxy for device-to-device communications within a data center. As one example, this disclosure describes techniques for providing a Peripheral Component Interconnect Express (PCIe) proxy for device-to-device communications employing the PCIe standard. In accordance with the techniques described in this disclosure, the PCIe proxy supports disaggregation of resources within the data center by operating as either a virtual PCIe switch or a virtual PCIe device.

In one example, the techniques provide a physical approach to disaggregation in which the interconnected DPUs operate as a locally attached PCIe switch used to connect a PCIe host device to a remotely located PCIe endpoint device using PCIe over fabric. As another example, the techniques provide a logical approach to disaggregation in which at least one of the DPUs may operate as a locally attached PCIe device that is in effect a virtual device used to abstract one or more physical PCIe endpoint devices that are locally or remotely attached to the DPU.

The disclosed techniques include adding PCIe proxy logic on top of a host unit of a DPU to expose a PCIe proxy model to application processors (i.e., compute nodes), storage devices (i.e., storage nodes), network interface controllers (NICs), field programmable gate arrays (FPGAs), or other end PCIe devices (e.g., PCIe host and PCIe endpoint devices). In some examples, the PCIe proxy logic implemented on the DPU exposes both local PCIe device functionality and PCIe switch functionality for remotely attached PCIe devices. The PCIe proxy model may be implemented as a physically distributed Ethernet-based switch fabric with PCIe proxy logic at the edge and fronting the end PCIe devices. In accordance with the disclosed techniques, the interconnected DPUs and the distributed Ethernet-based switch fabric together provide a reliable, low-latency, and scaled-out transport that operates as a PCIe proxy. The scaled-out transport is transparent to the end PCIe devices (i.e., it is logically a locally attached PCIe switch or a locally attached PCIe device from the end PCIe devices' perspectives) as long as the reliability and latency provided by the scaled-out transport are substantially similar to that provided by PCIe. The host unit of the DPU may comprise a PCIe controller configured to support both non-volatile memory express (NVMe) storage nodes (e.g., SSDs) and other end PCIe devices such as compute nodes (e.g., devices including CPUs and GPUs), NICs, and FPGAs.

The techniques described in this disclosure further include a tunnel transport protocol used by the interconnected DPUs of the scaled-out transport to maintain the capabilities of a PCIe switch and make any PCIe devices exposed by the DPUs appear to be locally attached to the PCIe host device. The PCIe proxy logic implemented on each of the DPUs converts between PCIe and Ethernet in which multiple PCIe transaction layer packets (TLPs) may be included in each Ethernet frame. More specifically, the PCIe proxy logic supports tunneling PCIe over the scaled-out transport using a tunnel transport protocol over Internet Protocol (IP) over Ethernet encapsulation. Tunneling PCIe using the tunnel transport protocol over IP over Ethernet, as opposed to assigning a new Ethertype in the case PCIe over Ethernet, enables layer 3 (L3) routing to occur within the scaled-out transport. The PCIe proxy logic also supports reliable transmission of the encapsulated packets within the scaled-out transport, and maintains PCIe ordering and deadlock prevention solutions. The PCIe proxy logic may further support security within the transport by using encrypted and authenticated tunnels. Moreover, the PCIe proxy logic may provide hot plug support with dynamic provisioning and allocation for graceful linking and unlinking of PCIe endpoint devices. The PCIe proxy logic may further enable remote direct memory access (RDMA) from any RDMA capable device connected to the network fabric to proxied PCIe endpoint devices.

The techniques described in this disclosure enable disaggregation of application processors, storage devices, network interface controllers (NICs), field programmable gate arrays (FPGAs), or other PCIe endpoint devices connected via the PCIe proxy. For example, the PCIe proxy described herein may decouple the conventional static allocation of graphics processing units (GPUs) to specific central processing units (CPUs). In accordance with the described techniques, GPUs may be pooled in a data center and dynamically shared across multiple compute nodes and/or shared across multiple customers. The PCIe proxy may be positioned between a compute node comprising a CPU and the pool of GPUs located anywhere in the data center. The PCIe proxy supports dynamic allocation and provisioning of a GPU from the pool of GPUs to the CPU of the compute node such that the allocated GPU appears to be a locally attached device from the perspective of the CPU.

In one example, this disclosure is directed to a network system comprising a plurality of DPUs interconnected via a network fabric, wherein each DPU of the plurality of DPUs implements proxy logic for a system bus connection, and wherein the plurality of DPUs and the network fabric together operate as a single system bus connection proxy; a host device locally attached to a host unit interface of a first DPU of the plurality of DPUs via a first system bus connection; and a plurality of endpoint devices locally attached to host unit interfaces of one or more second DPUs of the plurality of DPUs via second system bus connections. The first DPU is configured to, upon receipt of packets from the host device on the host unit interface of the first DPU and destined for a given endpoint device of the plurality of endpoint devices, establish a logical tunnel across the network fabric between the first DPU and one of the second DPUs to which the given endpoint device is locally attached, encapsulate the packets using a transport protocol, and send the encapsulated packets over the logical tunnel to the one of the second DPUs. The one of the second DPUs is configured to, upon receipt of the encapsulated packets, extract the packets and send the packets on a host unit interface of the one of the second DPUs to the given endpoint device.

In another example, this disclosure is directed to a first DPU integrated circuit comprising a networking unit interconnected with a plurality of DPUs via a network fabric; a host unit comprising a host unit interface locally attached to a host device via a system bus connection; and at least one processing core. The at least one processing core is configured to execute proxy logic for a system bus connection, wherein the plurality of DPUs, including the first DPU integrated circuit, and the network fabric together operate as a single system bus connection proxy, and wherein the host unit interface is configured to provide access to the single system bus connection proxy operating as at least one of a virtual switch attached to one or more of a plurality of endpoint devices or a virtual device implemented as an abstraction of one or more of the plurality of endpoint devices; and upon receipt of packets from the host device on the host unit interface and destined for a given endpoint device of the plurality of endpoint devices, establish a logical tunnel across the network fabric between the first DPU integrated circuit and a second DPU integrated circuit of the plurality of DPUs to which the given endpoint device is locally attached, encapsulate the packets using a transport protocol, and send the encapsulated packets over the logical tunnel to the second DPU integrated circuit.

In a further example, this disclosure is directed to a method comprising configuring, by a first DPU of a plurality of DPUs interconnected via a network fabric and implementing proxy logic for a system bus connection, a host unit interface of the first DPU to operate in a first mode for a system bus connection by which the host unit interface is locally attached to a host device, wherein the plurality of DPUs and the network fabric together operate as a single system bus connection proxy, and wherein the host unit interface of the first DPU is configured to provide access to the single system bus connection proxy operating as at least one of a virtual switch attached to one or more of a plurality of endpoint devices or as a virtual device implemented as an abstraction of one or more of the plurality of endpoint devices. The method further comprises receiving, on the host unit interface of the first DPU, packets from the host device on the host unit interface, wherein the packets are destined for a given endpoint device of the plurality of endpoint devices; establishing a logical tunnel across the network fabric between the first DPU and a second DPU of the plurality of DPUs to which the given endpoint device is locally attached; encapsulating the packets using a transport protocol; and sending the encapsulated packets over the logical tunnel to the second DPU.

The details of one or more examples are set forth in the accompanying drawings and the description below. Other features, objects, and advantages will be apparent from the description and drawings, and from the claims.

DETAILED DESCRIPTION

Figure 1:
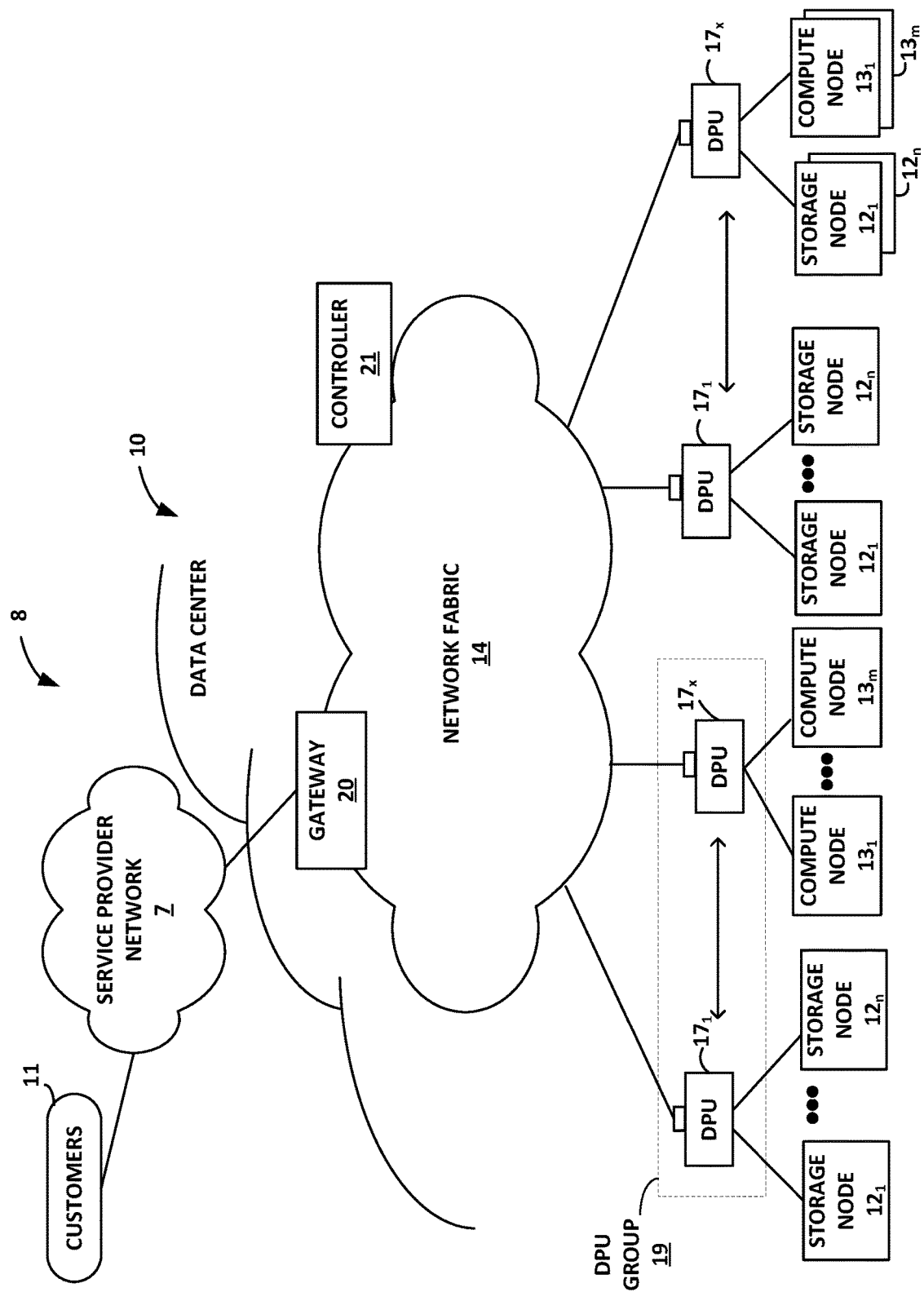
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. This disclosure describes techniques for providing a scaled-out transport supported by interconnected data processing units (DPUs) 17 that operates as a single system bus connection proxy for device-to-device communications between storage nodes 12 and/or compute nodes 13 within a data center 10. The disclosed techniques enable disaggregation of application processors, storage devices, network interface controllers (NICs), field programmable gate arrays (FPGAs), or other endpoint devices connected via the scaled-out transport. In the example of FIG. 1, various data structures and processing techniques are described with respect to DPUs 17 within data center 10. Other devices within a network, such as routers, switches, servers, firewalls, gateways, and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center service provider network 7 and gateway device 20. In other examples, service provider network 7 may be a data center wide-area network (DC WAN), private network, or other type of network. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

Software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10. In some examples, SDN controller 21 may operate in response to configuration input received from a network administrator. Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, data center 10 includes a set of storage nodes 12 and compute nodes 13 interconnected via a high-speed network fabric 14. In some examples, storage nodes 12 and compute nodes 13 are arranged into multiple different groups, each including any number of nodes up to, for example, n storage nodes $12_1$-$12_n$ and m compute nodes $13_1$-$13_m$ (collectively, "storage nodes 12" and "compute nodes 13"). Storage nodes 12 and compute nodes 13 provide storage and computation facilities, respectively, for applications and data associated with customers 11 and may be physical (bare-metal) servers, virtual machines running on physical servers, virtualized containers running on physical servers, or combinations thereof.

As illustrated, each of storage nodes 12 and compute nodes 13 is coupled to network fabric 14 by a data processing unit (DPU) 17 for processing streams of information, such as network packets or storage packets. In example implementations, DPUs 17 are configurable to operate in a standalone network appliance having one or more DPUs. For example, DPUs 17 may be arranged into multiple different DPU groups 19, each including any number of DPUs up to, for example, x DPUs $17_1$-$17_x$. In other examples, each DPU may be implemented as a component (e.g., electronic chip) within a device, such as a compute node, storage node, or application server, and may be deployed on a motherboard of the device or within a removable card, such as a storage and/or network interface card.

In general, each DPU group 19 may be configured to operate as a high-performance I/O hub designed to aggregate and process network and/or storage I/O for multiple storage nodes 12 and compute nodes 13. As described above, the set of DPUs 17 within each of the DPU groups 19 provides highly-programmable, specialized I/O processing circuits for handling networking and communications operations on behalf of storage nodes 12 and compute nodes 13.

As further described herein, in one example, each DPU 17 is a highly programmable I/O processor specially designed for offloading certain functions from storage nodes 12 and compute nodes 13. In one example, each DPU 17 includes a number of internal processor clusters, each including two or more processing cores and equipped with hardware engines that offload cryptographic functions, compression, and regular expression (RegEx) processing, data storage functions including deduplication and erasure coding, and networking operations. In this way, each DPU 17 includes components for fully implementing and processing network and storage stacks on behalf of one or more storage nodes 12 or compute nodes 13. In addition, DPUs 17 may be programmatically configured to serve as a security gateway for its respective storage nodes 12 and/or compute nodes 13, freeing up the processors of the nodes to dedicate resources to application workloads. In some example implementations, each DPU 17 may be viewed as a network interface subsystem that implements full offload of the handling of data packets (with zero copy in server memory) and storage acceleration for the attached nodes. In one example, each DPU 17 may be implemented as one or more application-specific integrated circuit (ASIC) or other hardware and software components, each supporting a subset of the storage nodes 12 and/or compute nodes 13.

DPUs 17 may also be referred to as access nodes, or devices including access nodes. In other words, the term access node may be used herein interchangeably with the term DPU. Additional example details of various example DPUs and access nodes are described in U.S. Pat. No. 10,659,254, issued May 19, 2020; U.S. Patent Publication No. 2019/0012278, published Jan. 10, 2019; and U.S. Pat. No. 10,725,825, issued Jul. 28, 2020, the entire contents of each being incorporated herein by reference.

In the example of FIG. 1, each DPU 17 provides connectivity to network fabric 14 for a different group of storage nodes 12 and/or compute nodes 13 and may be assigned respective IP addresses and provide routing operations for storage nodes 12 and/or compute nodes 13 coupled thereto. DPUs 17 may interface with and utilize network fabric 14 so as to provide any-to-any interconnectivity such that any of storage nodes 12 and/or compute nodes 13 may communicate packet data for a given packet flow to any other of the nodes using any of a number of parallel data paths within the data center 10. In addition, DPUs 17 described herein may provide additional services, such as storage (e.g., integration of solid-state storage devices), security (e.g., encryption), acceleration (e.g., compression), I/O offloading, and the like. In some examples, one or more of DPUs 17 may include storage devices, such as high-speed solid-state drives or rotating hard drives, configured to provide network accessible storage for use by applications executing on the nodes. More details on the data center network architecture and interconnected DPUs illustrated in FIG. 1 are available in U.S. Pat. No. 10,686,729, issued Jun. 16, 2020, the entire contents of which are incorporated herein by reference.

An example architecture of DPUs 17 is described below with respect to FIG. 3. The architecture of each DPU 17 comprises a multiple core processor system that represents a high performance, hyper-converged network, storage, and data processor and input/output hub. The architecture of each DPU 17 is optimized for high performance and high efficiency stream processing. DPUs 17 may process stream information by managing "work units." In general, a work unit (WU) is a container that is associated with a stream state and used to describe (i.e., point to) data within a stream (stored in memory) along with any associated meta-data and operations to be performed on the data.

Although DPUs 17 are described in FIG. 1 with respect to network fabric 14 of data center 10, in other examples, DPUs may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is network connectivity between the DPUs. The packet switched network may use any technology, including IP over Ethernet as well as other technologies. Irrespective of the type of packet switched network, DPUs may spray individual packets for packet flows between the DPUs and across multiple parallel data paths in the packet switched network and reorder the packets for delivery to the destinations.

Each of DPUs 17 may include a set of host unit interfaces to connect to storage nodes 12 and/or compute nodes 13. The host unit interfaces may be, for example, Peripheral Component Interconnect Express (PCIe) interfaces. In accordance with the techniques of this disclosure, host units (e.g., PCIe controllers) of DPUs 17 may support host unit interfaces configured to operate in rootport (RP) and endpoint (EP) modes for application having well-defined and open protocols, e.g., non-volatile memory express (NVMe) applications, at end PCIe devices (e.g., PCIe host and PCIe endpoint devices) as well as in upstream (UP) and downstream (DN) virtual switch modes for other applications having unknown protocols at end PCIe devices. More details on the dynamic configuration of host unit interfaces to support RP and EP modes are available in U.S. Patent Publication No. 2020/0073840, published Mar. 5, 2020, the entire contents of which are incorporated herein by reference.

The need for increased storage performance and capacity is rapidly increasing with the growth of big-and-fast data workloads such as artificial intelligence (AI) and analytics. Along with the need for more and faster storage solutions comes more stringent reliability, availability, and security requirements. The emergence of faster, more reliable, and more efficient storage, such as SSDs, along with improved storage protocols, such as NVMe and NVMe over Fabrics, have exposed bottlenecks in the storage stack itself, which is commonly implemented to run on CPUs. By disaggregating storage and decoupling storage from compute, CPU bottlenecks may be reduced. In addition, to the storage benefits, disaggregation of compute, storage, and networking components into separate servers enables these components to be pooled for on-demand deployment within data centers. The disaggregation of resources, however, requires that data that used to travel on an internal PCIe system bus now flows across a network, significantly increasing network traffic within data centers.

This disclosure describes techniques for providing a scaled-out transport supported by the interconnected DPUs 17 that operates as a single system bus connection proxy for device-to-device communications between storage nodes 12 and/or compute nodes 13 within data center 10. As one example, this disclosure describes techniques for providing a PCIe proxy for device-to-device communications employing the PCIe standard. In accordance with the techniques described in this disclosure, the PCIe proxy supports disaggregation of resources within the data center by operating as either a virtual PCIe switch or a virtual PCIe device.

In one example, the techniques provide a physical approach to disaggregation in which the interconnected DPUs 17 operate as a locally attached PCIe switch used to connect a PCIe host device (e.g., one of compute nodes 13) to a remotely located PCIe endpoint device (e.g., one of storage nodes 12) using PCIe over network fabric 14. As another example, the techniques provide a logical approach to disaggregation in which at least one of DPUs 17 may operate as a locally attached PCIe device from the perspective of the PCIe host device where the locally attached PCIe device is in effect a virtual device used to abstract one or more PCIe endpoint devices, which may be locally attached or remotely connected to the DPU 17.

The disclosed techniques include adding PCIe proxy logic on top of host units of each of DPUs 17 to expose a PCIe proxy model to storage nodes 12, compute nodes 13, or other end PCIe devices such as NICs or FPGAs. In some examples, the PCIe proxy logic implemented on DPU 17 exposes both local PCIe device functionality and PCIe switch functionality for remotely attached PCIe devices. The PCIe proxy model may be implemented as a physically distributed Ethernet-based switch fabric with PCIe proxy logic at the edge in DPUs 17 and fronting the end PCIe devices (e.g., storage nodes 12 and/or compute nodes 13). In accordance with the disclosed techniques, the interconnected DPUs 17 and the distributed Ethernet-based switch fabric together provide a reliable, low-latency, and scaled-out transport that operates as a PCIe proxy. The scaled-out transport is transparent to the end PCIe devices (e.g., storage nodes 12 and/or compute nodes 13) in that it is logically a locally attached PCIe switch or a locally attached PCIe device from the end PCIe devices' perspectives, as long as the reliability and latency provided by the scaled-out transport are substantially similar to that provided by PCIe. As discussed above, the host unit of each of DPUs 17 may comprise a PCIe controller configured to support both applications having well-defined and open protocols, e.g., NVMe applications, and other of applications having unknown protocols at end PCIe devices.

The techniques described in this disclosure include a tunnel transport protocol used by interconnected DPUs 17 of the scaled-out transport to maintain the capabilities of a PCIe switch and make any PCIe devices exposed by DPUs 17 appear to be locally connected to the PCIe host device. The PCIe proxy logic implemented on each of DPUs 17 converts between PCIe and Ethernet in which multiple PCIe transaction layer packets (TLPs) may be included in each Ethernet frame. More specifically, the PCIe proxy logic supports tunneling PCIe over the scaled-out transport using the tunnel transport protocol over IP over Ethernet encapsulation. Tunneling PCIe using the tunnel transport protocol over IP over Ethernet, as opposed to assigning a new Ethertype as in the case of PCIe over Ethernet, enables Layer 3 (L3) routing to occur within the scaled-out transport.

The PCIe proxy logic implemented on each of DPUs 17 also supports reliable transmission of the encapsulated packets within the scaled-out transport, and maintains PCIe ordering and deadlock prevention solutions. For example, the PCIe proxy logic may require receipt of acknowledgements for transmitted packets and retransmission for all dropped or lost packets. The PCIe proxy logic may further support security within the scaled-out transport by using encrypted and authenticated tunnels. Moreover, the PCIe proxy logic may provide hot plug support with dynamic provisioning and allocation for graceful linking and unlinking of PCIe endpoint devices. The PCIe proxy logic may further enable remote direct memory access (RDMA) from any RDMA capable device connected to network fabric 14 to proxied PCIe endpoint devices.

In some examples, the tunnel transport protocol may comprise a version of a Fabric Control Protocol (FCP) that supports reliable transmission. FCP may be used by the different operational networking components of any of DPUs 17 to facilitate communication of data across network fabric 14. FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spraying of packets of a flow to all paths between a source and a destination node. More details on the FCP are available in U.S. Patent Publication No. 2019/0104206, published Apr. 4, 2019, the entire content of which is incorporated herein by reference.

Figure 2A:
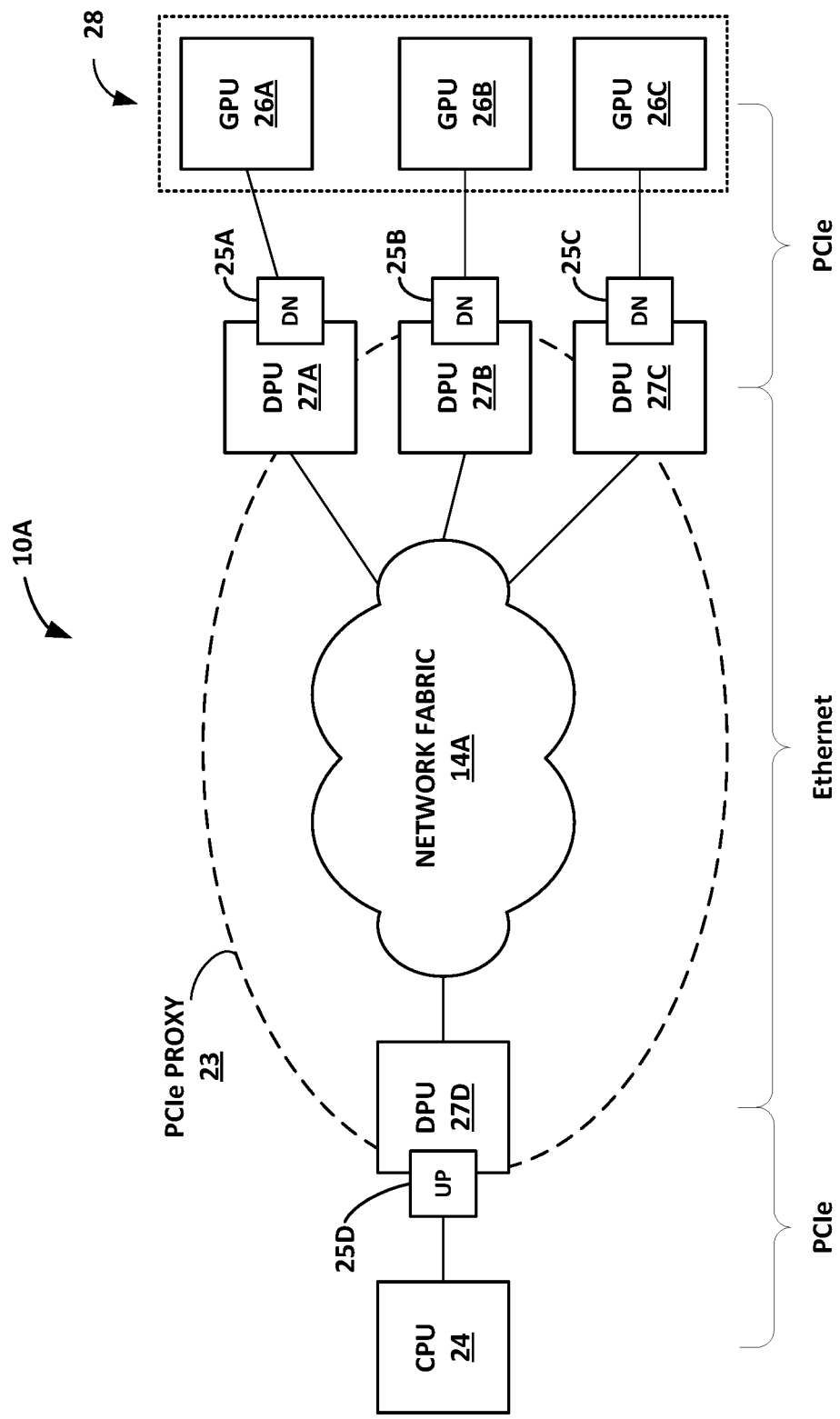
FIGS. 2A-2B are block diagrams illustrating various example implementations of a PCIe proxy for device-to-device communications, in accordance with the techniques of this disclosure.
Figure 2B:
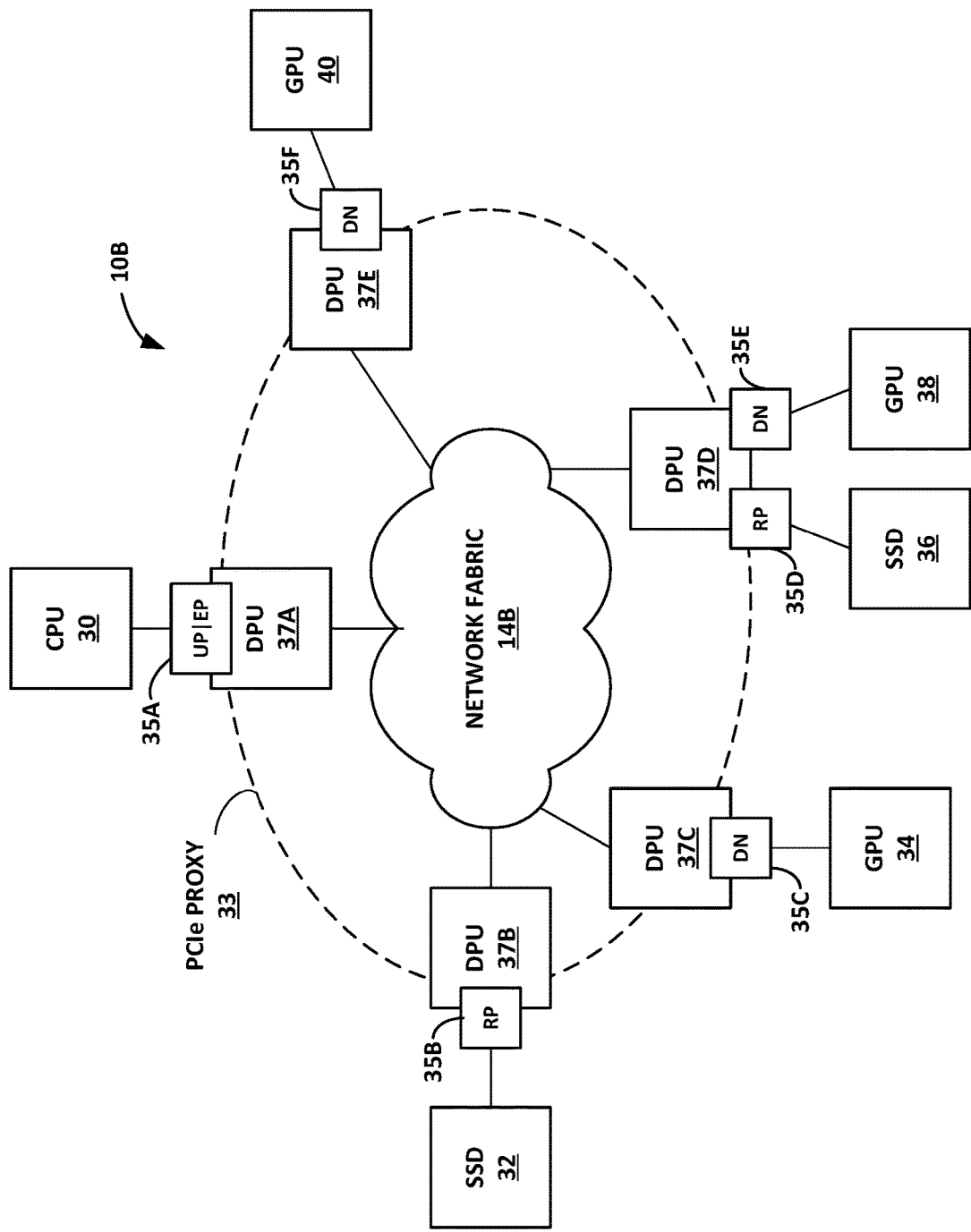

FIGS. 2A-2B are block diagrams illustrating various example implementations of a PCIe proxy for device-to-device communications, in accordance with the techniques of this disclosure.

FIG. 2A illustrates an example data center 10A that includes a central processing unit (CPU) 24 and three graphics processing units (GPUs) 26A-26C (collectively "GPUs 26") that are each coupled to a network fabric 14A via one of DPUs 27A-27D (collectively "DPUs 27"). DPUs 27 may operate substantially similar to DPUs 17 from FIG. 1. Each of CPU 24 and GPUs 26 may be included in different compute nodes 13 from FIG. 1.

According to the disclosed techniques, each of DPUs 27 is configured to implement PCIe proxy logic to support four modes for each of its host unit interfaces or ports as endpoint (EP) and rootport (RP) for applications having well-defined and open protocols, e.g., NVMe, and switch upstream (UP) and switch downstream (DN) for unknown application protocols. In the example of FIG. 2A, each of GPUs 26A, 26B, 26C is coupled to a respective one of DPUs 27A, 27B, 27C via a host unit interface 25A, 25B, 25C operating in a DN mode. CPU 24 is coupled to DPU 27D via a host unit interface 25D operating in an UP mode.

The PCIe proxy logic and supported host unit interface modes enable the DPUs 27 to operate as PCIe proxy 23 positioned between CPU 24 and GPUs 26. In accordance with the techniques of this disclosure, DPUs 27 and PCIe proxy 23 together provide a reliable, low-latency, and scaled-out transport that is transparent to the end PCIe devices, i.e., CPU 24 and GPUs 26, as long as the reliability and latency provided by the scaled-out transport are substantially similar to that provided by PCIe. In the example of FIG. 2A, PCIe proxy 23 operates as a logical PCIe switch from the perspective of CPU 24 and GPUs 26 such that CPU 24 and GPUs 26 each appear to be locally attached to a PCIe switch. In the example of FIG. 2A, PCIe proxy 23 is logically a 4-port PCIe switch in which CPU 24 communicates with three GPUs 26. In other examples where a CPU communicates directly to a GPU using a dedicated PCIe port, a PCIe proxy operates as a logical 2-port PCIe switch.

The techniques described in this disclosure enable disaggregation of storage nodes 12, compute nodes 13, or other PCIe endpoint devices connected via a PCIe proxy. For example, as illustrated in FIG. 2A, PCIe proxy 23 may enable decoupling of the conventional static allocation of GPUs to specific CPUs. As shown in FIG. 2A, GPUs 26 may be housed in a single location as a pool 28 anywhere within data center 10. Using the PCIe proxy logic implemented on DPUs 27, pool 28 of GPUs 26 may be shared across multiple compute nodes 13 and/or shared across multiple customers 11 (FIG. 1). In the example of FIG. 2A, any of GPUs 26 may be allocated and provisioned from pool 28 to CPU 24. In this way, the PCIe proxy logic implemented on DPUs 27 decouples the typical static allocation of GPUs to specific CPUs, and instead enables CPU 24 to utilize any of GPUs 26 within the remotely located pool 28 as though GPUs 26 were locally attached to CPU 24.

The ability to disaggregate GPUs from specific CPUs further enables data centers to be built with fewer resources. In this way, each compute node 13 within a data center does not need to include all the necessary resources as locally attached devices. For example, GPUs are expensive and may not be fully utilized by one or more locally attached CPUs. The PCIe proxy logic implemented on DPUs 27, as described in this disclosure, enables GPUs 26 to be shared as virtualized GPUs between a plurality of remotely located CPUs within data center 10A. In this way, none of GPUs 26 may be statically assigned to CPU 24. Instead, DPU 27A may implement a virtualized GPU as an abstraction of remotely connected GPU 26A, for example, and the virtualized GPU may be allocated and provisioned to CPU 24. In some examples, another virtual GPU as an abstracted version of GPU 26A may be allocated and provisioned to another CPU (not shown) in data center 10A.

In the example of FIG. 2A, upon allocating and provisioning a virtualized version of GPU 26A from pool 28 to CPU 24, DPU 27D receives PCIe TLPs from CPU 24 via host unit interface 25D operating in the UP mode. DPU 27D, implementing the PCIe proxy logic, determines that the PCIe TLPs are destined for remotely located GPU 26A, and converts from PCIe to Ethernet by packing the PCIe TLPs into Ethernet frames. DPU 27D then tunnels the PCIe packets over PCIe proxy to DPU 27A using a tunnel transport protocol over IP over Ethernet encapsulation. DPU 27A receives the encapsulated packets from DPU 27D. DPU 27A, implementing the PCIe proxy logic, decapsulates the PCIe TLPs from the Ethernet frames to convert from Ethernet back to PCIe. DPU 27A then forwards the PCIe TLPs to GPU 26A for processing. DPU 27A forwards the PCIe TLPs to GPU 26A via host unit interface 25A operating in the DN mode. In accordance with the disclosed techniques, GPU 26A and the processing performed by GPU 26A appear to be locally attached to a PCIe switch from the perspective of CPU 24.

FIG. 2B illustrates an example data center 10B that includes multiple different application processors (e.g., CPU 30 and GPUs 34, 38, 40) and storage devices (e.g., SSDs 32, 36) that are each coupled to a network fabric 14B via one of DPUs 37A-37E (collectively "DPUs 37"). DPUs 37 may operate substantially similar to DPUs 17 from FIG. 1. Each of CPU 30 and GPUs 34, 38, 40 may be included in different compute nodes 13 from FIG. 1, and each of SSDs 32, 36 may be included in different storage nodes 12 from FIG. 1.

Similar to FIG. 2A, each of DPUs 37 is configured to implement PCIe proxy logic to support the four modes (i.e., EP, RP, UP, DN) for each of its host unit interfaces. The supported host unit interface modes enable the DPUs 37 to operate as PCIe proxy 33 positioned between the application processors and storage nodes. In the example of FIG. 2B, CPU 30 is coupled to DPU 37A via a first host unit interface 35A having multiple functions including a first function operating in an UP mode for unknown application protocols and a second function operating in an EP mode for known application protocols, e.g., NVMe. Each of SSDs 32, 36 is coupled to a respective one of DPUs 37B, 37D via a host unit interface 35B, 35D operating in a RP mode. Each of GPUs 34, 38, 40 is coupled to a respective one of DPUs 37C, 37D, 37E via a host unit interface 35C, 35E, 35F operating in a DN mode.

As shown in FIG. 2B, at least some of DPUs 37 may include multiple host unit controllers to enable multiple host unit interfaces operating in different modes and/or multiple functions of a single host unit interface operating in different modes to co-exist on the same DPU and belong to the same PCIe proxy 33. For example, for PCIe proxy 33, DPU 37A includes a single host unit interface 35A having a first function operating in the UP mode and a second function operating in the EP mode. DPU 37D includes first host unit interface 35D operating in the RP mode and second host unit interface 35E operating in the DN mode. In some other examples, a single DPU may have both an UP function and a DN function that co-exist and belong to the same PCIe proxy as either separate host unit interfaces or within a single host unit interface. In addition, one or more of DPUs 37 may expose at least one host unit interface for local PCIe functions as well as for PCIe switch functions for remotely attached PCI devices.

In examples where CPU 30 executes an application that uses NVMe as a storage protocol to transfer data between CPU 30 and SSDs 32, 36, DPU 37A exposes host unit interface 35A as an NVMe EP to CPU 30. Host unit interface 35A may include two PCIe functions or branches—one function operating in switch upstream (UP) mode used to physically connect CPU 30 to GPUs 34, 38, 40 attached to DN mode ports using PCIe over network fabric 14B and the other function operating in EP mode used to logically connect CPU 30 to a virtual PCIe device (e.g., a virtual SSD) implemented by DPU 37A. CPU 30 performs PCIe enumeration on host unit interface 35A of DPU 37A and discovers the UP function and the EP function. For the UP function, CPU 30 sees PCIe proxy 33 as a PCIe switch having an upstream port and one or more downstream ports attached to PCIe endpoint devices, such as GPUs 34, 38, 40. For the EP function, CPU 30 only sees that the locally attached device provides EP functionality but does not know where the EP is physically implemented, i.e., PCIe proxy 33 is invisible and appears to CPU 30 as a locally attached PCIe device. According to the disclosed techniques, DPUs 37 and network fabric 14B comprising PCIe proxy 33 are configured to disaggregate or extend the EP functionality across network fabric 14B to one or more remote SSDs, such as SSDs 32, 36. For example, the EP functionality of host unit interface 35A may be extended toward remote SSD 32 by binding together the independent RP/EP trees of CPU 30 to DPU 37A and DPU 37B to SSD 32.

In the case where CPU 30 selects the EP function of host unit interface 35A of DPU 37A, PCIe proxy 33 operates as the virtual SSD, which may be an abstraction of one or more physical SSDs that are locally or remotely attached to DPU 37A (e.g., SSDs 32, 36). At the other side of PCIe proxy 33, DPU 37B exposes host unit interface 35B as an NVMe RP to SSD 32 and DPU 37D exposes host unit interface 35D as an NVMe RP to SSD 36.

The NVMe protocol, being a well-known and open protocol, enables DPUs 37 to terminate the RP/EP tree with CPU 30 and intercept the traffic between CPU 30 and one or more of SSDs 32, 36 to provide application-level features. In this way, CPU 30 accesses each of SSDs 32, 36 via DPUs 37 using EP and RP functionality. In some examples, the EP and RP functionality may also be used by DPUs 37 to enable disaggregation of other types of PCIe endpoint devices, such as NICs or FPGAs, that are either remotely or locally attached to the DPUs. In other examples, the UP and DN functionality may be used by DPUs 37 to enable disaggregation of SSDs by not terminating any PCIe trees and staying at a PCIe transport level for the scale out, but this comes at the cost of losing the application-level features.

In other examples where CPU 30 executes an application that uses an unknown application protocol to transfer data between CPU 30 and GPUs 34, 38, 40, DPUs 37 cannot use the EP/RP modes to intercept traffic in order to achieve scale out. In the case where CPU 30 selects the UP function of host unit interface 35A of DPU 37A to access remotely attached GPUs 34, 38, 40, PCIe proxy 33 operates as a virtual PCIe switch between CPU 30 and GPUs 34, 38, 40. In accordance with the techniques of this disclosure, when operating in the UP/DN modes, DPUs 37 are configured to stay at a PCIe transport level for the scale out. In this case, DPUs 37 and PCIe proxy 33 provide a reliable, low-latency and scaled-out transport between end PCIe devices (e.g., CPU 30 and GPUs 34, 38, 40), and ensure that the transport is logically a PCIe switch from the perspective of the end PCIe devices. At the other side of PCIe proxy 33, DPU 37C exposes host unit interface 35C as a DN port to GPU 34, DPU 37D exposes host unit interface 35E as a DN port to GPU 38, and exposes host unit interface 35F as a DN port to GPU 40. In this way, CPU 30 and GPUs 34, 38, 40 communicate with each other via the PCIe proxy logic implemented on each of DPUs 37. In some examples, the UP and DN functionality may also be used by DPUs 37 to enable disaggregation of other types of PCIe endpoint devices, such as NICs or FPGAs, that are either remotely or locally attached to the DPUs.

Figure 3:
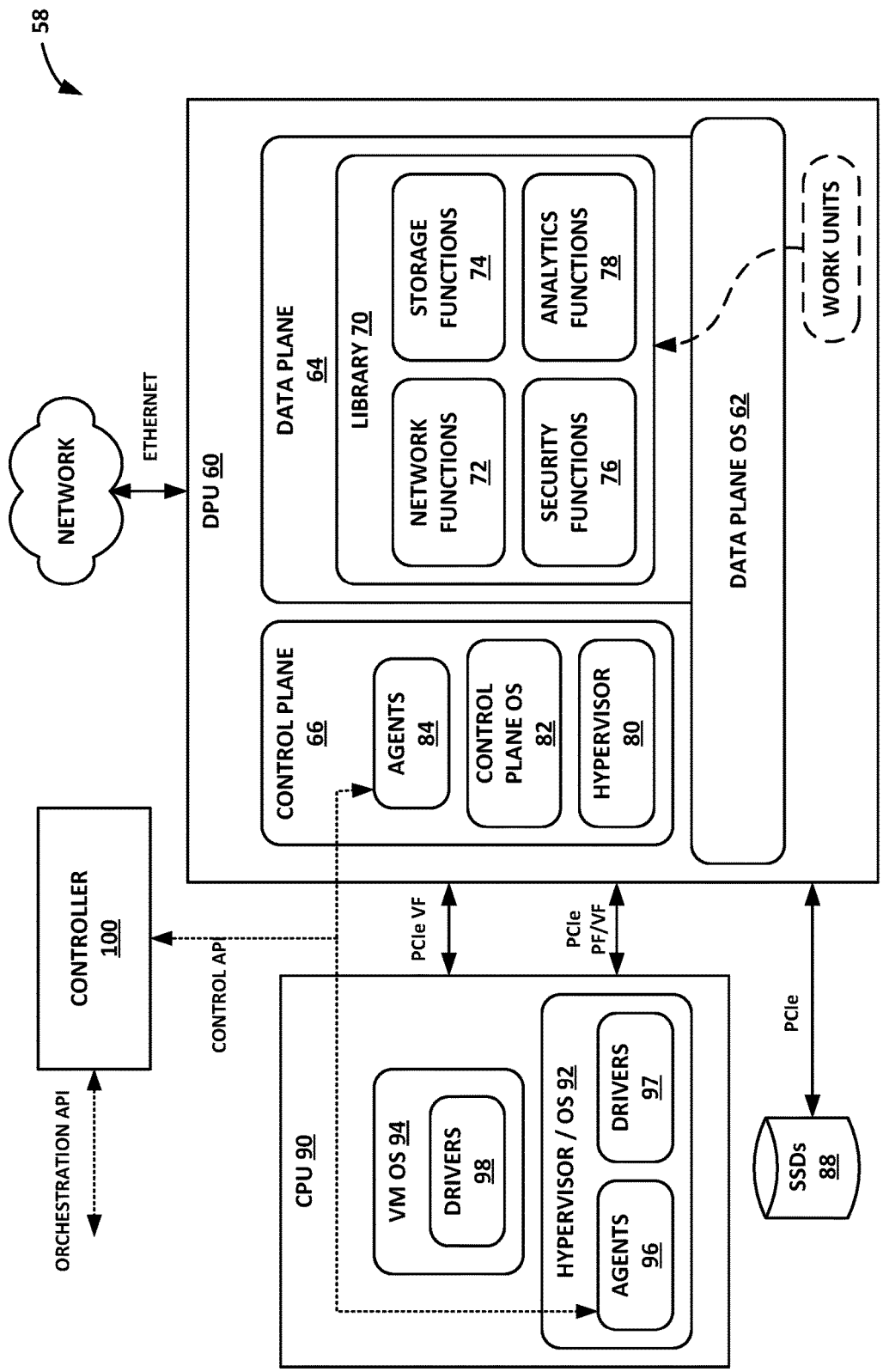
FIG. 3 is a block diagram illustrating a system including an example data processing unit communicatively coupled to an example application processor via a PCIe connection.

FIG. 3 is a block diagram illustrating a system 58 including an example DPU 60 communicatively coupled to an example application processor (i.e., CPU 90) via a PCIe connection. As illustrated in FIG. 3, DPU 60 includes a run-to-completion data plane operating system (OS) 62 configured to process work units. Each of DPU 60 and CPU 90 generally represents a hardware chip implemented in digital logic circuitry. DPU 60 and CPU 90 may be hosted on the same or different computing devices. DPU 60 may operate substantially similar to any of DPUs 17, 27, or 37 from FIGS. 1-2B. CPU 90 may operate substantially similar to any of CPUs 24 or 30 from FIGS. 2A-2B. In the illustrated example of FIG. 3, system 58 also includes example storage devices (i.e., SSDs 88) communicatively coupled to DPU 60 via a PCIe connection. SSDs 88 may operate substantially similar to any of SSDs 32, 36 from FIG. 2B.

DPU 60 is a highly programmable I/O processor with a plurality of processing cores (as discussed below, e.g., with respect to FIG. 5). In the illustrated example of FIG. 3, DPU 60 includes a network interface (e.g., an Ethernet interface) to connect directly to a network, and a plurality of host interfaces (e.g., PCIe interfaces) to connect directly to one or more application processors (e.g., CPU 90) and one or more storage devices (e.g., SSDs 88). DPU 60 also includes run-to-completion data plane OS 62 executing on two or more of the plurality of processing cores. Data plane OS 62 provides data plane 64 as an execution environment for a run-to-completion software function invoked on data plane OS 62 to process a work unit. The work unit is associated with one or more stream data units (e.g., packets of a packet flow), and specifies the software function for processing the stream data units and one processing core of the plurality of processing cores for executing the software function.

The software function invoked to process the work unit may be one of a plurality of software functions for processing stream data included in a library 70 provided by data plane OS 62. In the illustrated example, library 70 includes network functions 72, storage functions 74, security functions 76, and analytics functions 78. Network functions 72 may, for example, include network I/O data processing functions related to Ethernet, network overlays, networking protocols, encryption, and firewalls. Storage functions 74 may, for example, include storage I/O data processing functions related to NVMe (non-volatile memory express), compression, encryption, replication, erasure coding, and pooling. Security functions 76 may, for example, include security data processing functions related to encryption, regular expression processing, and hash processing. Analytics functions 78 may, for example, include analytical data processing functions related to a customizable pipeline of data transformations.

In accordance with the techniques of this disclosure, network functions 72 include PCIe proxy logic used to facilitate device-to-device communications employing the PCIe standard over an Ethernet-based switch fabric. More specifically, the PCIe proxy logic converts between PCIe and Ethernet, and tunnels PCIe over the Ethernet-based switch fabric using a tunnel transport protocol over IP over Ethernet encapsulation. The PCIe proxy logic uses the tunnel transport protocol to maintain PCIe data processing solutions (e.g., reliability, ordering, deadlock prevention, and hot plug support solutions) within the PCIe proxy logical tunnel. In addition, the PCIe proxy logic supports four modes for each of its host unit interfaces (e.g., PCIe interfaces), including EP and RP for applications having well-defined and open protocols, e.g., NVMe, and switch UP and DN for unknown application protocols. In this way, DPU 60, along with other DPUs interconnected by the Ethernet-based switch fabric, supports a scaled-out transport that is transparent to the end PCIe devices (e.g., CPU 90 and SSDs 88) and operates as either a virtual PCIe switch or a virtual PCIe device.

In general, data plane OS 62 is a low level, run-to-completion operating system running on bare metal of DPU 62 that runs hardware threads for data processing and manages work units. Data plane OS 62 includes the logic of a queue manager to manage work unit interfaces, enqueue and dequeue work units from queues, and invoke a software function specified by a work unit on a processing core specified by the work unit. In the run-to-completion programming model, data plane OS 62 is configured to dequeue a work unit from a queue, process the work unit on the processing core, and return the results of processing the work unit to the queues.

DPU 60 also includes a multi-tasking control plane operating system executing on one or more processing cores of the plurality of processing cores. In some examples, the multi-tasking control plane operating system may comprise Linux, Unix, or a special-purpose operating system. In some examples, as illustrated in FIG. 3, data plane OS 62 provides a control plane 66 including a control plane software stack executing on data plane OS 62. As illustrated, the control plane software stack includes a hypervisor 80, a multi-tasking control plane OS 82 executing on hypervisor 80, and one or more control plane service agents 84 executing on control plane OS 82. Hypervisor 80 may operate to isolate control plane OS 82 from the work unit and data processing performed on data plane OS 62. Control plane service agents 84 executing on control plane OS 82 comprise application level software configured to perform set up and tear down of software structures to support work unit processing performed by the software function executing on data plane OS 62. In the example of data packet processing, control plane service agents 84 are configured to set up the packet flow for data packet processing by the software function on data plane OS 62, and tear down the packet flow once the packet processing is complete. In this way, DPU 60 comprises a highly programmable processor that can run application level processing while leveraging the underlying work unit data structure for highly parallelized stream processing.

In another example, instead of running on top of data plane OS 62, the multi-tasking control plane operating system may run on one or more independent processing cores that are dedicated to the control plane operating system and different than the processing cores executing data plane OS 62. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

CPU 90 is an application processor with one or more processing cores optimized for computing-intensive tasks. In the illustrated example of FIG. 3, CPU 90 includes a plurality of host interfaces (e.g., PCIe interfaces) to connect directly to DPU 60. CPU 90 includes a hypervisor/OS 92 that supports one or more service agents 96 and one or more drivers 97. As illustrated in FIG. 3, CPU 90 may also include a virtual machine (VM) OS 94 executing on top of hypervisor/OS 92 that supports one or more drivers 98. Application level software, such as agents 96 or drivers 97 executing on OS 92 or drivers 98 executing on VM OS 94, of CPU 90 may determine which data processing tasks to offload from CPU 90 to DPU 60. In accordance with the techniques of this disclosure, CPU 90 may send PCIe TLPs destined for either a remotely connected or locally attached PCIe endpoint device, e.g., a GPU, SSD, NIC, or FPGA, to DPU 60 using physical functions (PFs) and/or virtual functions (VFs) of PCIe links for further transmission over the scaled-out transport via the PCIe proxy logic implemented on DPU 60. Similarly, CPU 90 may send PCIe TLPs to a VF of DPU 60 on behalf of VM OS 94. From the perspective of CPU 90, DPU 60 appears to be either a locally attached PCIe switch or the locally attached PCIe device.

In the illustrated example of FIG. 3, system 58 also includes a controller 100 in communication with both DPU 60 and CPU 90 via a control application programming interface (API). Controller 100 may provide a high-level controller for configuring and managing application level software executing on a control plane operating system of each of DPU 60 and CPU 90. For example, controller 100 may configure and manage which data processing tasks are to be offloaded from CPU 90 to DPU 60. In some examples, controller 100 may comprise a software-defined networking (SDN) controller, which may operate substantially similar to controller 21 of FIG. 1. In some examples, controller 100 may operate in response to configuration input received from a network administrator via an orchestration API.

Figure 4:
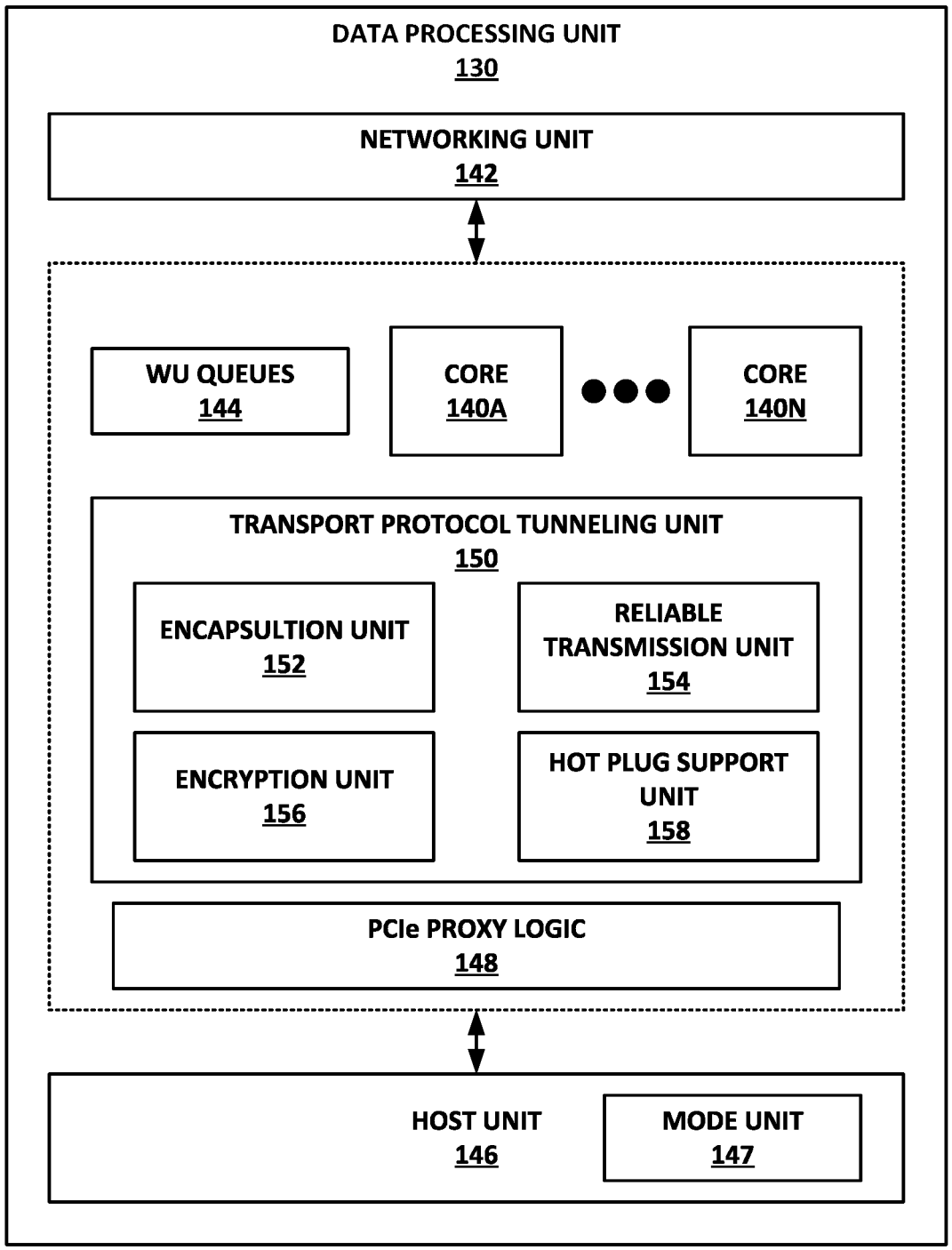
FIG. 4 is a block diagram illustrating an example data processing unit, in accordance with the techniques of this disclosure.

FIG. 4 is a block diagram illustrating an example data processing unit 130, in accordance with the techniques of this disclosure. DPU 130 generally represents a hardware chip implemented in digital logic circuitry. DPU 130 may operate substantially similar to any of the DPUs 17 of FIG. 1, DPUs 27 of FIG. 2A, DPUs 37 of FIG. 2B, or DPU 60 of FIG. 3. Thus, DPU 130 may be communicatively coupled to one or more storage nodes, compute nodes, CPUs, GPUs, FPGAs, SSDs, network devices, server devices, storage devices, network fabrics, or the like, e.g., via a network interface such as Ethernet (wired or wireless), a system bus connection interface such as PCIe, or other such communication media.

In the illustrated example of FIG. 4, DPU 130 includes a plurality of programmable processing cores 140A-140N ("cores 140"). DPU 130 also includes a networking unit 142, a plurality of work unit (WU) queues 144, and at least one host unit 146 having a mode unit 147. Although not illustrated in FIG. 4, each of cores 140, networking unit 142, WU queues 144, and host unit 146 are communicatively coupled to each other. In accordance with the techniques of this disclosure, PCIe proxy logic 148 and transport protocol tunneling unit 150 may be implemented on DPU 130 to provide a scaled-out transport that operates as a PCIe proxy for end PCIe devices (e.g., CPUs, GPUs, other compute nodes, SSDs, other storage nodes, NICs, and/or FPGAs).

In this example, DPU 130 represents a high performance, hyper-converged network, storage, and data processor and input/output hub. For example, networking unit 142 may be configured to send and receive stream data units with one or more external devices, e.g., network devices. Networking unit 142 may perform network interface card functionality, packet switching, and the like, and may use large forwarding tables and offer programmability. Networking unit 142 may expose network interface (e.g., Ethernet) ports for connectivity to a network, such as network fabric 14 of FIG. 1. Host unit 146 may expose one or more host unit interface (e.g., PCIe) ports to send and receive stream data units with end PCIe devices (e.g., PCIe host and PCIe endpoint devices). DPU 130 may further include one or more high bandwidth interfaces for connectivity to off-chip external memory (not illustrated in FIG. 4).

At least one of WU queues 144 may be associated with each of cores 140 and configured to store a plurality of work units enqueued for processing on the respective one of the cores 140. In some examples, each of cores 140 may have a dedicated one of WU queues 144 that stores work units for processing by the respective one of cores 140. In other examples, each of cores 140 may have two or more dedicated WU queues 144 that store work units of different priorities for processing by the respective one of cores 140.

Cores 140 may comprise one or more of MIPS (microprocessor without interlocked pipeline stages) cores, ARM (advanced RISC (reduced instruction set computing) machine) cores, PowerPC (performance optimization with enhanced RISC-performance computing) cores, RISC-V (RISC five) cores, or complex instruction set computing (CISC or x86) cores. Each of cores 140 may be programmed to process one or more events or activities related to a given packet flow such as, for example, a networking packet flow, a storage packet flow, a security packet flow, or an analytics packet flow. Each of cores 140 may be programmable using a high-level programming language, e.g., C, C++, or the like.

In some examples, the plurality of cores 140 executes instructions for processing a plurality of events related to each data packet of a packet flow, received by networking unit 142 or host unit 146, in a sequential manner in accordance with one or more work units associated with the data packets. Work units are sets of data exchanged between cores 140 and networking unit 142 or host unit 146 where each work unit may represent one or more of the events related to a given data packet. More specifically, a work unit is associated with one or more data packets, and specifies a software function for processing the data packets and further specifies one of cores 140 for executing the software function.

In general, to process a work unit, the one of cores 140 specified by the work unit is configured to retrieve the data packets associated with the work unit from a memory, and execute the software function specified by the work unit to process the data packets. For example, receiving a work unit is signaled by receiving a message in a work unit receive queue (e.g., one of WU queues 144). Each of WU queues 144 is associated with one of cores 140 and is addressable in the header of the work unit message. Upon receipt of the work unit message from networking unit 142, host unit 146, or another one of cores 140, the work unit is enqueued in the one of WU queues 144 associated with the one of cores 140 specified by the work unit. The work unit is later dequeued from the one of WU queues 144 and delivered to the one of cores 140. The software function specified by the work unit is then invoked on the one of cores 140 for processing the work unit. The one of cores 140 then outputs the corresponding results of processing the work unit back to WU queues 144.

More details on the components and functionality of DPUs are described in U.S. Patent Publication No. 2019/0012278, published Jan. 10, 2019 and U.S. Pat. No. 10,725,825, issued Jul. 28, 2020, the entire contents of each being incorporated herein by reference.

In order to support the PCIe proxy described herein, PCIe proxy logic 148 is added on top of host unit 146 to expose a PCIe proxy model to the end PCIe devices communicatively coupled to DPU 130 via host unit 146. In some examples, PCIe proxy logic 148 may comprise software functionality executed by one or more of processing cores 140. In other examples, PCIe proxy logic 148 may comprise hardware (i.e., logic circuits) implemented on DPU 130. In accordance with the disclosed techniques, the PCIe proxy model is implemented as a reliable, low-latency, and scaled-out transport that is transparent to the end PCIe devices.

Host unit 146 may include one or more PCIe controllers (not shown in FIG. 4) configured to enable PCIe interfaces or ports of host unit 146 to operate in different modes. More specifically, PCIe proxy logic 148 supports four modes for each PCIe interface or port as EP/RP modes to NVMe storage nodes (e.g., SSDs) or other end PCIe devices using known application protocols, and switch UP/DN modes to other end PCIe devices (e.g., devices including CPUs and GPUs) using unknown application protocols. PCIe proxy logic 148 may set the operational modes for the PCIe interfaces or ports via mode unit 147 of host unit 146.

PCIe proxy logic 148 uses tunnel transport protocol unit 150 to maintain the capabilities of a PCIe switch and make any PCIe devices exposed by DPU 130 appear to be locally attached to the PCIe host device. Transport protocol tunneling unit 150 includes encapsulation unit 152 configured to convert between PCIe and Ethernet by packing multiple PCIe TLPs into each Ethernet frame, and applying a tunnel transport protocol over IP over Ethernet encapsulation for tunneling PCIe over the scaled-out transport. Tunneling PCIe using the tunnel transport protocol over IP over Ethernet, as opposed to assigning a new Ethertype in the case PCIe over Ethernet, enables L3 routing to occur within the scaled-out transport. Transport protocol tunneling unit 150 also includes reliable transmission unit 154 configured to support reliable transmission of the encapsulated packets within the scaled-out transport, and maintains PCIe ordering and deadlock prevention solutions. Transport protocol tunneling unit 150 includes encryption unit 156 to support security within the transport by using encrypted tunnels. Moreover, transport protocol tunneling unit 150 includes hot plug support unit 158 configured to perform dynamic provisioning and allocation for graceful linking and unlinking of PCIe endpoint devices. Transport protocol tunneling unit 150 may further enable RDMA from any RDMA capable device connected to the network fabric to proxied PCIe endpoint devices. Finally, transport protocol tunneling unit 150 implements network congestion avoidance and control mechanisms.

In one example, when PCIe traffic is received by a PCIe interface or port of host unit 146 operating a Switch Upstream or Downstream Function, the traffic may be split into Slow Path and Fast Path. For example, valid PCIe configuration TLPs received by a Switch Upstream Function go through Slow Path where processors are involved to implement PCIe features in software. Other Switch TLPs may go through the Fast Path in hardware for performance. In another example, when PCIe traffic is received by a PCIe interface or port of host unit 146 operating an RP or EP Function, there is no change to the RP traffic flow and the EP traffic flow only changes for processing of configuration TLPs. For configuration TLPs of an EP traffic flow, there is configured information per PCIe controller of host unit 146 to either handle all such TLPs by the Fast Path or the Slow Path.

For Slow Path processing in software, the Configuration Request TLPs received by a PCIe Switch Upstream Function are directly sent over to one of cores 140. By processing the Configuration Request TLPs, software executed by cores 140 sets up the PCIe routing database in both the local DPU 130 housing the PCIe Switch Upstream Port on host unit 146 and all remote DPUs housing PCIe Switch Downstream Ports to enable DPU 130 to perform Fast Path hardware routing of TLPs. Cores 140 may also perform PCIe capabilities that are not implemented by the hardware PCIe controllers by composing completion TLPs to the PCIe host device from which the Configuration Request TLPs were received.

For Fast Path hardware routing, memory request TLPs, completion TLPs, and ID-routed message TLPs, received by a PCIe Switch Function are routed by host unit 146 hardware by looking up the routing database that was set up by cores 140 as described above. For each Switch Upstream Port, software sets up a lookup database to support a maximum-scale PCIe Switch, e.g., 1 Upstream Port and 32 Downstream Ports. Such database is duplicated to every DPU that houses one or more Switch Ports of the PCIe proxy. The database supports both memory address-based routing and ID-based routing. The routing result is a flow index. The flow index may be mapped to a global transport index for transport across a distributed Ethernet-based switch fabric. Host unit 146 hardware pushes the TLPs into a queue for the flow index. A per flow maximum transmission unit (MTU) in bytes will be programmed. For every MTU bytes of TLPs accumulated, host unit 146 hardware sends out a WU carrying information for the accumulated bytes. The flow queues are also used by software to inject TLPs or special control packets that are for communication between DPUs. One typical use is to communicate an outcome of the Slow Path processing.

The networking unit 142 that processes the WUs will free up storage once the TLPs are read for transmission, which allows host unit 146 hardware to push more TLPs (and control packets) into the queue. That engine is also responsible for: resolving the Downstream Port in the destination DPU; encapsulating the TLPs and control packets into Ethernet packets; and delivering the encapsulated packets reliably to the destination DPU Downstream Port. The destination DPU will do the reverse: decapsulate the Ethernet byte streams; retrieve the original TLPs and control packets; send the TLPs to the attached endpoint PCIe devices; and consume/terminate the control packets in the destination DPU. The destination DPU may be remotely located or the same source DPU, e.g., DPU 130, and may even be the same source port in the same source DPU.

The techniques of this disclosure are directed to building a direct hardware path between host unit 146 and network unit 142, and building a reliable and low-latency transport among networking units belonging to different DPUs. In this way, PCIe TLPs may be delivered across a distributed Ethernet-based switch fabric that operates as a PCIe proxy, i.e., a virtual PCIe device or a virtual PCIe switch. On a source DPU, e.g., DPU 130, one or more of cores 140 execute encapsulation unit 152 to pack TLPs into Ethernet packets, and execute reliable transmission unit 154 to reliably deliver the encapsulated packets to destination DPUs in tunnels. On a destination DPU, the encapsulated packets are unpacked back to the original TLPs and sent to the destination PCIe endpoint devices.

Reliable transmission unit 154 enables DPU 130 to maintain PCIe ordering rules for correctness and deadlock avoidance even when the TLPs are encapsulated and tunneled over Ethernet. As one example, per source-controller and destination-controller pairs per each direction, reliable transmission unit 154 puts TLPs that have ordering requirements into the same tunnel and delivers the TLPs in strict order. In some cases, for a source-destination controller pair per each direction, TLPs delivered in Switch Fast Path may be put into a single tunnel. As another example, reliable transmission unit 154 puts aside non-posted request TLPs to enable posted request TLPs and completion TLPs to bypass them, in order to avoid deadlock. In some cases, each DPU that sinks non-posted request TLPs have enough buffer to store them aside so as not to prevent later-arrived posted request TLPs or completion TLPs (delivered by the same tunnel) from being delivered to the local PCIe links should non-posted request TLPs be flow-controlled by the PCIe link.

DPU software may inject packets carrying posted request TLPs into the Fast Flow towards networking unit 142. These injected packets are packed the same way as the normal TLPs. DPU hardware itself may also inject special packets to facilitate communication between DPU hardware without software getting involved. The injected packets may include a hardware-injected read acknowledgement (Read_Ack) message, a software-injected WU, or a software-injected posted request TLP.

Hot plug support unit 158 enables DPU 130 to support standard PCIe hot-plug, async removal, and downstream port containment (DPC) even across the distributed Ethernet-based switch fabric. In a PCIe Downstream port (e.g., an RP or DN mode Port), PCIe has defined capabilities to support both orderly addition/removal (i.e., standard hot-plug or sync hot-plug) and async removal of PCIe devices.

The Standard PCI hot-plug (including hot-add and hot-removal) is performed in a lock-step manner with the operating system through a well-defined sequence of user actions and system management facilities. Async removal refers to the removal of an adapter or disabling a Downstream Port Link due to error containment without prior warning to the operation system. DPC (Downstream Port Containment) is a feature of a Downstream Port. DPC halts PCIe traffic below a downstream port after an unmasked uncorrectable error is detected at or below the port, avoiding the potential spread of any data corruption and permitting error recovery if supported by software. Among the errors that can trigger DPC, the "Surprise Down Error" is an important one and it is reported when the Downstream Link is down (for example, due to Async Removal of the attached device.

Hot plug support unit 158 further enables DPU 130 to support Switch Port Containment (SPC) by tracking non-posted request TLPs within a scaled-out PCIe Switch. SPC tracks every pending non-posted request TLP in the scaled-out PCIe Switch and, in case of link failures across the distributed Ethernet-based switch fabric or peripheral PCIe links, DPUs are responsible to compose completion TLPs to avoid PCIe completion timeout in CPUs or other PCIe endpoints (such as GPUs).

The SPC feature may only be turned on when a non-posted request TLP and its completion TLPs take the same path (on the opposite direction). The SPC tracks non-posted request on links among the switch ports. Since in this disclosure, a PCIe switch is physically disjointed and scaled-out into a network, the virtual PCIe switch or PCIe proxy needs to recover gracefully when the connectivity/links within the scaled-out network breaks and causes completions never to come back. This scenario does not exist for a normal PCIe switch. The SPC also performs enhanced tracking of non-posted requests sent to the local Switch Downstream Port. The SPC tracks every non-posted request towards the local Switch Downstream Port, independently of any triggered DPC. In addition, the SPC composes a completion for every pending non-posted request upon DPC being fired or when a hardware timeout occurs. In contrast, the standard DPC only requires composing completions for non-posted requests arriving after DPC is triggered. In addition, the SPC composes a completion for every pending non-posted request upon link down or when a hardware timeout occurs. For standard PCIe switches, all TLPs are to be discarded upon link down, and no completions are required to be composed.

When completions take different paths from their non-posted requests, the SPC feature is turned off. The PCIe access control services (ACS) feature allows a non-posted request and its related completions to go through different paths. When different paths are taken, no corresponding completion may be seen by the remote or local tracking tables. Further, for the remote tracking table, a new mechanism is disclosed to clean up the pending non-posted requests in the remote tracking table in order to replenish the reserved buffer at the destination DPU. In the new mechanism, a destination DPU sends special Read_Ack messages back to the source DPU. A Read_Ack message echoes back the index of the entry in the remote tracking table carried by the non-posted request. Along with each index, the amount of buffer to be recovered is also returned. The "destination address" to deliver the Read_Ack is expected to be prepared by the network unit of the DPU that received the non-posted request. A Read_Ack message can carry multiple indices of the remote tracking table.

Reliable transmission unit 154 further enables DPU 130 to implement solutions for deadlock avoidance. A PCIe interconnect has strict bypass rules to avoid deadlock. One key bypass is to allow posted requests and completions to bypass non-posted requests when non-posted requests cannot make forward progress. In the virtual PCIe switch architecture described herein, all TLPs of a given direction from a given source DPU switch port are delivered to a given destination DPU switch port in a single tunnel. With this single tunnel approach, for all non-posted requests submitted into the tunnel, either the completions of these non-posted requests need to have guaranteed space in the source DPU or a destination DPU needs to have guaranteed space to store aside all received non-posted requests from all possible source DPUs.

Figure 5:
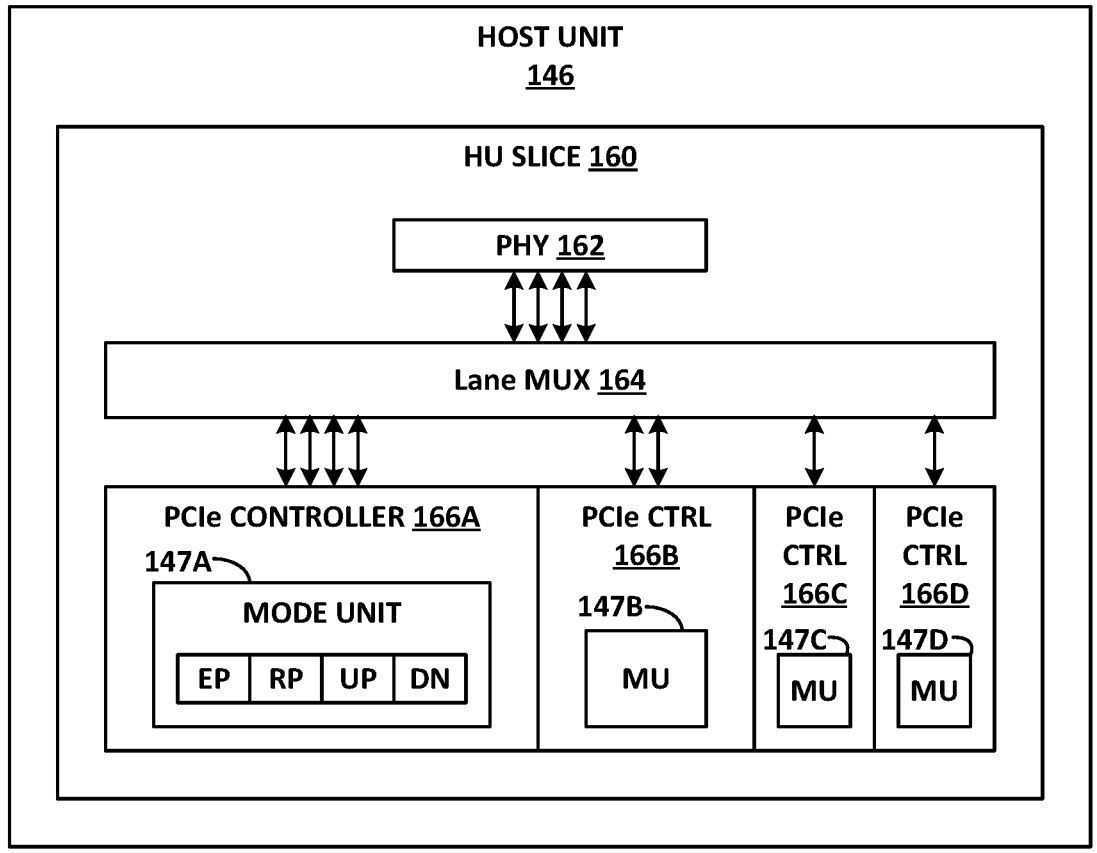
FIG. 5 is a block diagram illustrating an example host unit of the data processing unit from FIG. 4, in accordance with the techniques of this disclosure.

FIG. 5 is a block diagram illustrating an example of host unit 146 of DPU 130 from FIG. 4, in accordance with the techniques of this disclosure. Host unit 146 includes at least one host unit (HU) slice 160 having one or more PCIe controllers 166. In some examples, host unit 146 may include multiple, identical HU slices.

HU slice 160 has one PCIe PHY 162 shared by four PCIe controllers 166A-166D (collectively, "PCIe controllers 166") via lane MUX 164. In one example, PHY 162 comprises a ×16 PCIe PHY. The 16 serdes from PHY 162 may be shared by PCIe controllers 166 is different configurations. In one example, PCIe controller 166A may comprise a ×16 PCIe controller that supports up to 16 PCIe serdes, but can also be configured as a ×8 controller or a ×4 controller. PCIe controller 166A may support up to 8 Physical Functions (PFs) of PCIe links. PCIe controller 166B may comprise a ×8 PCIe controller that supports up to 8 PCIe serdes. PCIe controller 166B may also support up to 8 PFs of PCIe links. PCIe controllers 166C and 166D may comprise ×4 PCIe controllers that each support up to 4 PCIe serdes. In examples where a ×16 PCIe controller is assigned a full 16 serdes, it may only support up to PCIe Gen3 speed. In examples, where a PCIe controller is assigned 8, 4, 2 or 1 serdes, it may support all the speeds from PCIe Gen1 through Gen4.

As illustrated in FIG. 5, PCIe controllers 166 include modes units (MUs) 147A-147D (collectively, "mode units 147"). Each of PCIe controllers 166 may operate in one of Endpoint (EP) or Rootport (RP) mode for NVMe or other known protocol applications or Switch Upstream (UP) or Switch Downstream (DN) mode for unknown protocol applications to implement the PCIe proxy described herein. The operational mode for each of PCIe controllers 166 may be set by host unit 146 or, in some examples, PCIe proxy logic 148 of DPU 130. The PCIe interfaces or ports exposed by each of PCIe controllers 166 operate according to the operational mode of the respective PCIe controller. The existence of multiple PCIe controllers 166, however, enables multiple PCIe ports operating in different modes and/or multiple functions of a single PCIe port operating in different modes to co-exist on the same DPU 130 and belong to the same PCIe proxy. For example, a single PCIe port may include two PCIe functions or branches—one function operating in a first mode (e.g., switch UP function mode) used to physically connect a PCIe host device to a physical PCIe endpoint device using PCIe over network fabric, and the other function operating in a second mode (e.g., EP function mode) used to logically connect the PCIe host device to a virtual PCIe device implemented by DPU 130 as an abstraction of one or more physical PCIe endpoint devices that are locally or remotely attached to DPU 130.

A PCIe switch typically has at most 33 ports: 1 upstream port and at most 32 downstream ports. In some examples, the only upstream port is assigned port_number 32 regardless of how many downstream ports exist, and the 32 downstream ports are assigned port_number 0 through 31, respectively. TLPs can be exchanged between any two ports in a PCIe Switch. The upstream port can talk to all 32 downstream ports bi-directionally. A downstream port can talk to all 33 ports (including itself) bi-directionally. When a PCIe switch is scaled-out into a distributed Ethernet interconnect, as described herein, logical tunnels are established between DPUs to allow switch ports located in different DPUs to communicate as if the switch ports were still in a single PCIe switch component. A tunnel is created per source switch port, per destination switch port, per direction. That is, for a switch port source-destination pair, two tunnels are created for bi-directional communication.

In some examples, for the scaled-out PCIe switch, a global identifier (GID) space may be shared by all the DPUs in a tunnel domain such that a tunnel is a {src_GID, dst_GID} pair. The tunnels may be used for both PCIe switch scale-out as well as other infrastructure mechanisms. As one example, DPU 130 may support 16*1024 tunnels per direction.

Within HU slice 160, the flow index may be organized as {destination_port_number_in_switch, source_controller_ID_in_slice}. DPU 130 has all addressing information for a controller: it uses destination_port_number_in_switch to find out where the peer ports are located, then programs lookup tables to set up the needed tunnels accordingly. The encapsulated TLP bytes are sent over to the destination DPUs via these tunnels.

When arriving at a destination DPU, its networking unit uses the tunnel information to go through a content-addressable memory (CAM) structure to retrieve the following information: destination_slice_ID, destination_controller_ID and source_port_number. The destination_slice_ID is needed to direct the packet (i.e., a WU) to the right port associated to the destination HU Slice. The destination_controller_ID and source_port_number are used by the destination HU Slice to compose the flow index for delivering a read acknowledgement message.

Figure 6:
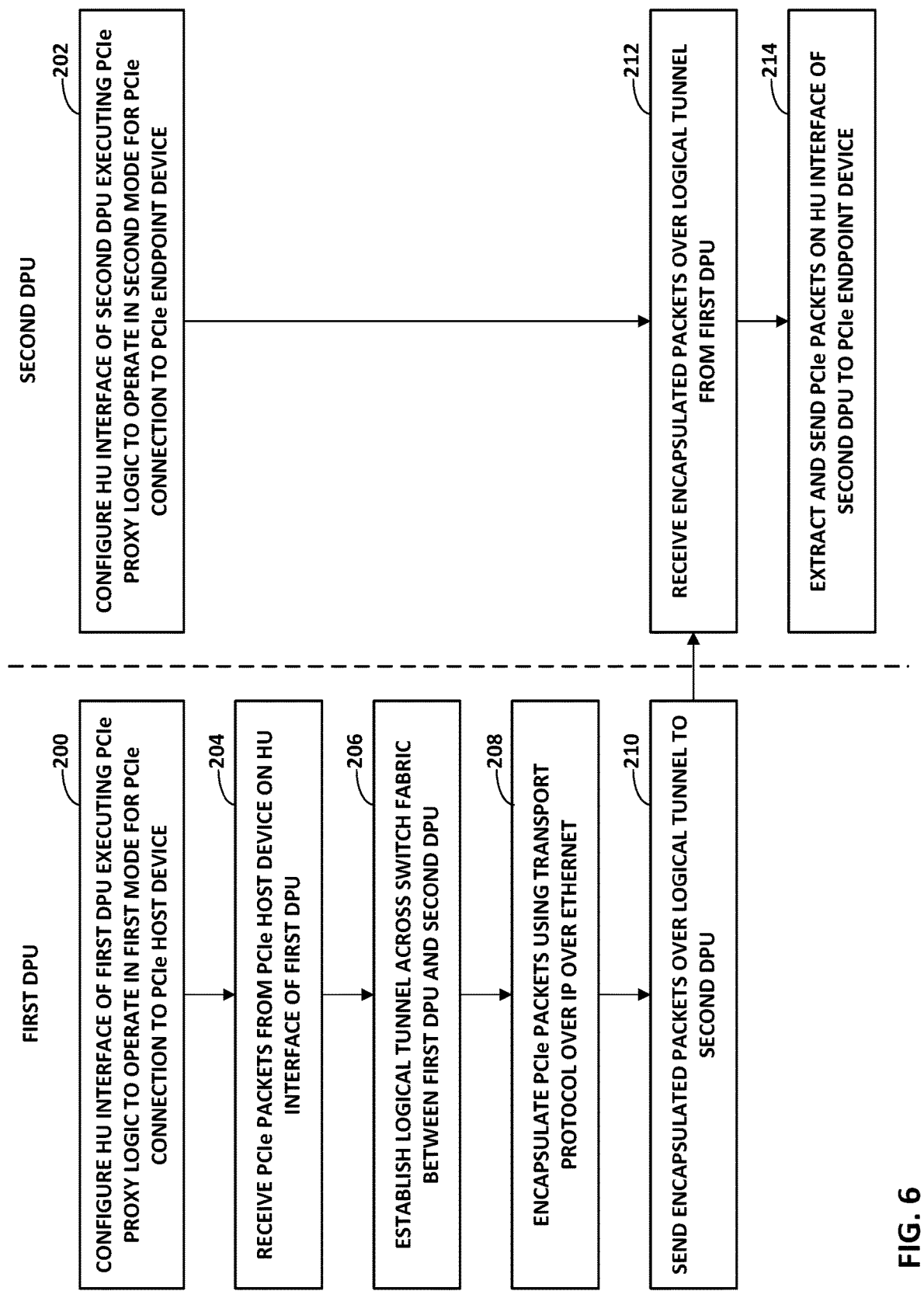
FIG. 6 is a flow diagram illustrating an example operation for converting between PCIe and Ethernet in a data processing unit, in accordance with the techniques of this disclosure.

FIG. 6 is a flow diagram illustrating an example operation for converting between PCIe and Ethernet in a data processing unit, in accordance with the techniques of this disclosure. A first example operation of FIG. 6 is described with respect to PCIe proxy 23 of FIG. 2A having DPU 27D as the first DPU and DPU 27A as the second DPU, and CPU 24 as the PCIe host device and GPU 26A as the PCIe endpoint device.

First DPU 27D implements PCIe proxy logic that configures host unit interface 25D of first DPU 27D to operate in a first mode, i.e., a switch upstream (UP) function mode, for the PCIe connection to CPU 24 (200). When configured to operate in the switch UP function mode, host unit interface 25D provides CPU 24 access to PCIe proxy 23 operating as a virtual switch attached to GPUs 26. Second DPU 27A also implements PCIe proxy logic that configures host unit interface 25A of second DPU 27A to operate in a second mode, i.e., a switch downstream (DN) function mode, for the PCIe connection to GPU 26A (202). When configured to operate in the switch DN function mode, host unit interface 25A provides GPU 26A access to PCIe proxy 23 operating as a virtual switch attached to CPU 24.

First DPU 27D receives PCIe packets from CPU 24 on host unit interface 25A (204). First DPU 27D determines that the received PCIe packets are destined for GPU 26A, which is locally attached to second DPU 27A interconnected to first DPU 27D via network fabric 14A. First DPU 27D establishes a logical tunnel across network fabric 14A between first DPU 27D and the second DPU 27A (206). First DPU 27D then encapsulates the PCIe packets using a transport protocol over IP over Ethernet encapsulation (208). First DPU 27D then sends the encapsulated packets over the logical tunnel to second DPU 27A (210).

Second DPU 27A receives the encapsulated packets over the logical tunnel from first DPU 27D (212). Second DPU 27A extracts the PCIe packets and sends the PCIe packets on host unit interface 25A to GPU 26A (214). These operations are transparent to CPU 24 and GPU 26A and appear, from the perspective of CPU 24 and GPU 26A, to be performed by a locally attached PCIe switch.

A second example operation of FIG. 6 is described with respect to PCIe proxy 33 of FIG. 2B having DPU 37A as the first DPU and DPU 37D as the second DPU, and CPU 30 as the PCIe host device and SSD 36 as the PCIe endpoint device. In this example, PCIe proxy 33 operates as a virtual SSD that appears, from the perspective of CPU 30, to be a locally attached PCIe endpoint device. DPU 37A may implement the virtual SSD as an abstraction of one or more physical PCIe endpoint devices that are locally and/or remotely attached to DPU 37A, e.g., SSD 36 attached to DPU 37D of PCIe proxy 33.

In the example of FIG. 2B, host unit interface 35A includes at least two PCIe functions with a first function operating in the switch UP mode and the second function operating in the EP mode. In the case where CPU 30 selects the EP function mode, first DPU 37A implements PCIe proxy logic that configures host unit interface 35A of first DPU 37A to operate in a first mode, i.e., the EP function mode, for the PCIe connection to CPU 30 (200). When configured to operate in the EP function mode, host unit interface 35A provides CPU 30 access to PCIe proxy 33 operating as a virtual SSD implemented as an abstraction of SSD 36. Second DPU 37D also implements PCIe proxy logic that configures host unit interface 35D of second DPU 37D to operate in a second mode, i.e., an RP function mode, for the PCIe connection to SSD 36 (202).

First DPU 37A receives PCIe packets from CPU 30 on host unit interface 35A (204) destined for the locally attached virtual SSD implemented by first DPU 37A as an abstraction of remotely attached SSD 36. First DPU 37A determines that the received PCIe packets are destined for SSD 36, which is communicatively coupled to second DPU 37D interconnected to first DPU 37A via network fabric 14B. First DPU 37A establishes a logical tunnel across network fabric 14B between first DPU 37A and the second DPU 37D (206). First DPU 37A then encapsulates the PCIe packets using a transport protocol over IP over Ethernet encapsulation (208). First DPU 37A then sends the encapsulated packets over the logical tunnel to second DPU 37D (210).

Second DPU 37D receives the encapsulated packets over the logical tunnel from first DPU 37A (212). Second DPU 37D extracts the PCIe packets and sends the PCIe packets on host unit interface 35D to SSD 36 (214). These operations are transparent to CPU 30 and appear, from the perspective of CPU 30, to be performed by a locally attached virtual SSD.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Various examples have been described. These and other examples are within the scope of the following claims.

What is claimed is:

1. A network system comprising:
a plurality of data processing units (DPUs) interconnected via a network fabric, wherein each DPU of the plurality of DPUs implements proxy logic for a system bus connection; and
a host device locally attached to a host unit interface of a first DPU of the plurality of DPUs, wherein the host device comprises an application processor,
wherein the first DPU is configured to, upon receipt of packets from the host device destined for a given endpoint device comprising a storage device, establish a logical tunnel across the network fabric between the first DPU and a second DPU of the plurality of DPUs to which the given endpoint device is locally attached, encapsulate the packets using a transport protocol by packing multiple system bus connection transaction layer packets (TLPs) into an Ethernet frame, and send the encapsulated packets over the logical tunnel to the second DPU;
wherein the proxy logic for the system bus connection configures the host unit interface of the first DPU and a host unit interface of the second DPU to operate in one of more of an endpoint mode, a rootport mode, a switch upstream function mode, or a switch downstream function mode;
wherein the proxy logic for the system bus connection implemented on the first DPU configures the host unit interface of the first DPU to operate in the endpoint mode to communicate with the host device; and
wherein the proxy logic for the system bus connection implemented on the second DPU configures a host unit interface of the second DPU to operate in the rootport mode to communicate with the given endpoint device.

2. The network system of claim 1, wherein, to encapsulate the packets using the transport protocol, the first DPU is configured to encapsulate the packets using a transport protocol over IP over Ethernet encapsulation.

3. The network system of claim 1, wherein the encapsulated packets are layer 3 (L3) routable within the logical tunnel across the network fabric.

4. The network system of claim 1, further comprising a plurality of endpoint devices that includes the given endpoint device, wherein the host unit interface of the first DPU is configured to provide the host device access to a system bus connection proxy operating as at least one of a virtual switch attached to one or more of the endpoint devices or a virtual device implemented as an abstraction of one or more of the endpoint devices.

5. The network system of claim 1,
wherein the host unit interface of the first DPU is configured to operate in the switch upstream function mode for a first system bus connection to provide the host device access to a system bus connection proxy operating as a virtual switch attached to one or more endpoint devices; and
wherein a host unit interface of one of the plurality of DPUs other than the first DPU is configured to operate in the switch downstream function mode for a second system bus connection to provide the given endpoint device access to the system bus connection proxy operating as the virtual switch attached to the host device.

6. The network system of claim 5, wherein, from the perspective of the host device and the given endpoint device, the system bus connection proxy appears to be a locally attached system bus connection switch.

7. The network system of claim 1,
wherein the host unit interface of the first DPU is configured to operate in the endpoint function mode for a first system bus connection to provide the host device access to a system bus connection proxy operating as a virtual device implemented as an abstraction of one or more endpoint devices; and
wherein the host unit interface of the second DPU is configured to operate in the rootport mode for a second system bus connection to the given endpoint device.

8. The network system of claim 7, wherein, from the perspective of the host device, the system bus connection proxy appears to be a locally attached endpoint device.

9. The network system of claim 1, wherein the host device comprises a central processing unit (CPU), and wherein the given endpoint device comprises a graphics processing unit (GPU) allocated and provisioned to the CPU from a pool of GPUs located anywhere in the network system.

10. The network system of claim 1, wherein the host unit interface of the first DPU exposes a logical system bus connection proxy model to the host device, and wherein the host unit interface of the second DPU exposes a logical system bus connection proxy model to a plurality of endpoint devices.

11. The network system of claim 1, wherein the proxy logic for the system bus connection supports reliable transmission of the encapsulated packets using the transport protocol by maintaining Peripheral Component Interconnect Express (PCIe) ordering and deadlock prevention solutions.

12. The network system of claim 1, wherein the proxy logic for the system bus connection supports security within the network fabric, and wherein the logical tunnel established by the first DPU comprises an encrypted tunnel.

13. A first data processing unit (DPU) integrated circuit comprising:
a networking unit interconnected with a plurality of DPUs via a network fabric, wherein each DPU of the plurality of DPUs implements proxy logic for a system bus connection;
a host unit comprising a host unit interface locally attached to a host device via a system bus connection, wherein the host device comprises a first application processor; and
at least one processing core configured to:
execute the proxy logic for the system bus connection implemented on the first DPU integrated circuit, and
upon receipt of packets from the host device on the host unit interface and destined for a given endpoint device comprising a second application processor, establish a logical tunnel across the network fabric between the first DPU integrated circuit and a second DPU integrated circuit of the plurality of DPUs to which the given endpoint device is locally attached, encapsulate the packets using a transport protocol by packing multiple system bus connection transaction layer packets (TLPs) into an Ethernet frame, and send the encapsulated packets over the logical tunnel to the second DPU integrated circuit,
wherein the proxy logic for the system bus connection configures the host unit interface of the first DPU integrated circuit and a host unit interface of the second DPU integrated circuit to operate in one of more of an endpoint mode, a rootport mode, a switch upstream function mode, or a switch downstream function mode;
wherein the proxy logic for the system bus connection implemented on the first DPU integrated circuit configures the host unit interface of the first DPU integrated circuit to operate in the switch upstream function mode to communicate with the host device; and
wherein the proxy logic for the system bus connection implemented on the second DPU integrated circuit configures the host unit interface of the second DPU integrated circuit to operate in the switch downstream function mode to communicate with the given endpoint device.

14. A method comprising:
configuring, by a first data processing unit (DPU) of a plurality of DPUs interconnected via a network fabric and implementing proxy logic for a system bus connection, a host unit interface of the first DPU to operate in a first mode for a system bus connection by which the host unit interface is locally attached to a host device;
receiving, on the host unit interface of the first DPU, packets from the host device on the host unit interface, wherein the packets are destined for a given endpoint device;
establishing a logical tunnel across the network fabric between the first DPU and a second DPU of the plurality of DPUs to which the given endpoint device is locally attached;
encapsulating the packets using a transport protocol by packing multiple system bus connection transaction layer packets (TLPs) into an Ethernet frame; and
sending the encapsulated packets over the logical tunnel to the second DPU, wherein the proxy logic for the system bus connection configures the host unit interface of the first DPU and a host unit interface of the second DPU to operate in one of more of an endpoint mode, a rootport mode, a switch upstream function mode, or a switch downstream function mode;

wherein the proxy logic for the system bus connection implemented on the first DPU configures the host unit interface of the first DPU to operate in the endpoint mode to communicate with the host device; and wherein the proxy logic for the system bus connection implemented on the second DPU configures a host unit interface of the second DPU to operate in the rootport mode to communicate with the given endpoint device.

15. The method of claim 14, further comprising:

configuring, by the second DPU, a host unit interface of the second DPU to operate in a second mode for a system bus connection by which the host unit interface of the second DPU is communicatively coupled to the given endpoint device; and upon receipt of the encapsulated packets, extracting, by the second DPU, the packets and sending, on the host unit interface of the second DPU, the packets to the second endpoint device.

\* \* \* \* \*